(12) United States Patent
Trudeau

(10) Patent No.: US 8,783,991 B2
(45) Date of Patent: Jul. 22, 2014

(54) MAGNETIC CLEANING TOOL WITH FLUID PUMP

(76) Inventor: Jamé Trudeau, Seattle, WA (US)

(*) Notice: Subject to any disclaimer, the term of this patent is extended or adjusted under 35 U.S.C. 154(b) by 611 days.

(21) Appl. No.: 13/163,685

(22) Filed: Jun. 18, 2011

(65) Prior Publication Data

US 2011/0311299 A1    Dec. 22, 2011

Related U.S. Application Data

(60) Provisional application No. 61/356,577, filed on Jun. 19, 2010.

(51) Int. Cl.
  *A47L 1/13* (2006.01)
  *A47L 1/03* (2006.01)

(52) U.S. Cl.
  CPC .... *A47L 1/13* (2013.01); *A47L 1/03* (2013.01)
  USPC .................... 401/188 R; 15/220.2; 15/250.28

(58) Field of Classification Search
  CPC ............... A47L 1/12; A47L 1/13; A47L 1/02; A47L 1/03; A47L 1/05; A47L 1/08
  USPC .......................... 401/188 R; 15/220.2, 250.28
  See application file for complete search history.

(56) References Cited

U.S. PATENT DOCUMENTS

| | | | | |
|---|---|---|---|---|
| 2,716,770 A | * | 9/1955 | Caldwel et al. | 401/139 |
| 3,731,337 A | * | 5/1973 | Doyel | 15/220.2 |
| 3,759,621 A | * | 9/1973 | De Carlo | 401/10 |
| 3,778,173 A | * | 12/1973 | De Carlo | 401/10 |
| 4,977,637 A | * | 12/1990 | Demers | 15/104.001 |
| 7,313,840 B2 | * | 1/2008 | Watkins | 15/103 |
| 2006/0090278 A1 | * | 5/2006 | Hang | 15/220.2 |
| 2009/0211607 A1 | * | 8/2009 | Garland | 134/21 |

* cited by examiner

*Primary Examiner* — David Walczak
*Assistant Examiner* — Joshua Wiljanen
(74) *Attorney, Agent, or Firm* — SpryIP, LLC

(57) ABSTRACT

Described herein are techniques related to a magnetic tool for cleaning one or more surfaces of a plate of magnetically permeable material, such as a window. With an implementation described herein, the tool includes a pair of magnetically attracted utensils designed to be magnetically coupled together through a window. While a user slides the utensil along an interior surface of the window, the second utensil follows the first utensil and slides along the exterior surface of the window. The second utensil is tethered to a fluid pump via a fluid-conductive hose. In this way, cleaning fluid may be delivered to the second utensil while it is on the exterior surface of the window and cleaning that surface. This Abstract is submitted with the understanding that it will not be used to interpret or limit the scope or meaning of the claims.

19 Claims, 3 Drawing Sheets

MAGNETIC CLEANING TOOL WITH FLUID PUMP

RELATED APPLICATIONS

This application claims the benefit of priority to U.S. Provisional Patent Application Ser. No. 61,356,577, filed on Jun. 19, 2010, the disclosure of which is incorporated by reference herein.

BACKGROUND

Cleaning windows is not a task that people look forward to doing. That is most especially true with regard to cleaning the outside of the windows. While cleaning the insides of windows is relatively easy, getting the outside glass spotless is difficult, time consuming, and expensive. Physically, it is often inconvenient to nearly impossible to access the outside of a window in such manner to effectively clean it.

Compounding the problem of access to the outside surface of a window is the fact that such surface is naturally exposed to the significantly more dirt and grit than is the inside surface. This typically increases both the level of dirt and how quickly the outside surface accumulates dirt after a cleaning (as compared to the inside surface).

Conventionally, when faced with the task of cleaning the exterior surface of the windows of a home, a homeowner may walk around the outside of the home to clean ground floor windows. In so doing, the homeowner may need to deftly navigate through bushes, trees, and/or gardens next to the home. Of course, this approach leaves the upper floors untouched.

To reach the exterior surface of the windows on the upper floors, the homeowner may climb a ladder. Alternatively, the homeowner may go inside the house and lean out an upper story windows and stretch out to clean the exterior surface of the windows. Climbing ladders or physically leaning out windows while attempting to clean the exterior of the windows is laborious, stressful, and awkward. Also, the cleaning is limited by the homeowner's physical reach. Moreover, this approach can be dangerous because the risk of a fall is quite real.

To avoid the risks of ladders and leaning out of upper-story windows, homeowners often hire a professional window cleaner. However, that option comes with significant costs. There are financial costs of the service being performed, of course, but there are also the costs of time in finding, hiring, and waiting for the arrival of the window washer on a designated day.

In light of these difficulties (e.g., financial and risk of physical harm), many homeowners opt for the most common solution of all—ignoring the problem and doing nothing about their dirty windows. Of course, this is not an actual solution. The windows just get dirtier and dirtier as the homeowner ignores the problem. This results in decreased light exposure and, of course, an inferior overall aesthetic feel.

SUMMARY

Described herein are techniques related to a magnetic tool with a fluid pump for cleaning one or more surfaces of a plate of magnetically permeable material, such as a window of a house or commercial building. With at least one implementation described herein, the tool includes a pair of magnetically attracted utensils designed to be placed on opposite sides of a window and magnetically coupled together through the window. While a user slides a first of the pair of utensils along an interior surface of the window, the second of the pair of utensils follows the first utensil and slides along the exterior surface of the window. The second utensil follows the first utensil because they are magnetically coupled through the window. Furthermore, the second utensil is tethered to a fluid pump via a fluid-conductive hose. In this way, cleaning fluid may be delivered to the second utensil while it is on the exterior surface of the window and cleaning that surface.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

The outsides of windows are hard to clean. Existing solutions to this problem are dangerous, impractical, time-consuming, and/or expensive. One or more implementations described herein offers a safe, practical, efficient, and inexpensive way to clean the outside of windows.

Described herein are techniques related to a magnetic cleaning tool with a fluid pump. One or more implementations of such a tool may include a pair of magnetic utensils having window-cleaning pad. One of the utensils is called a first, interior, and/or leader utensil herein. The other utensil is called a second, exterior, and/or follower utensil herein. In the context of a window, a user places the exterior utensil against the exterior surface of the window and the interior utensil against the interior surface of the window. Since the utensils have magnetic properties, the utensils are magnetically coupled through the window with the window-cleaning pad of each utensil facing the window surface.

While gripping the interior utensil, the user slides the utensil along the interior surface of the window. Since they are magnetically coupled, the exterior utensil moves along the exterior surface of the window in a manner that mirrors the movements of the interior utensil. In doing so, the exterior and/or the interior surface of the window are cleaned while the window-cleaning pads of the utensils wipe the surface.

A fluid pump is attached to the exterior utensil via a flexible fluid-conducting tube or hose. This hose acts as a tether to prevent the exterior utensil from plummeting out of reach if the utensils become uncoupled. Also, the hose delivers cleaning fluid to the exterior utensil to aid in cleaning the exterior surface of the window.

This fluid delivery approach has the flushing power needed to remove thick debris and dirt on the window. Conventional approach of using a spray bottle does not have sufficient flushing power to adequately remove thick accumulations and cannot reach the entire exterior surface of the window. The use of the magnetic utensils with fluid delivery to the exterior surface solves both the problem of reach and of cleaning/rinsing of the exterior surfaces of windows and the like.

Exemplary Magnetic Cleaning Tool with Fluid Pump

Figure 1:
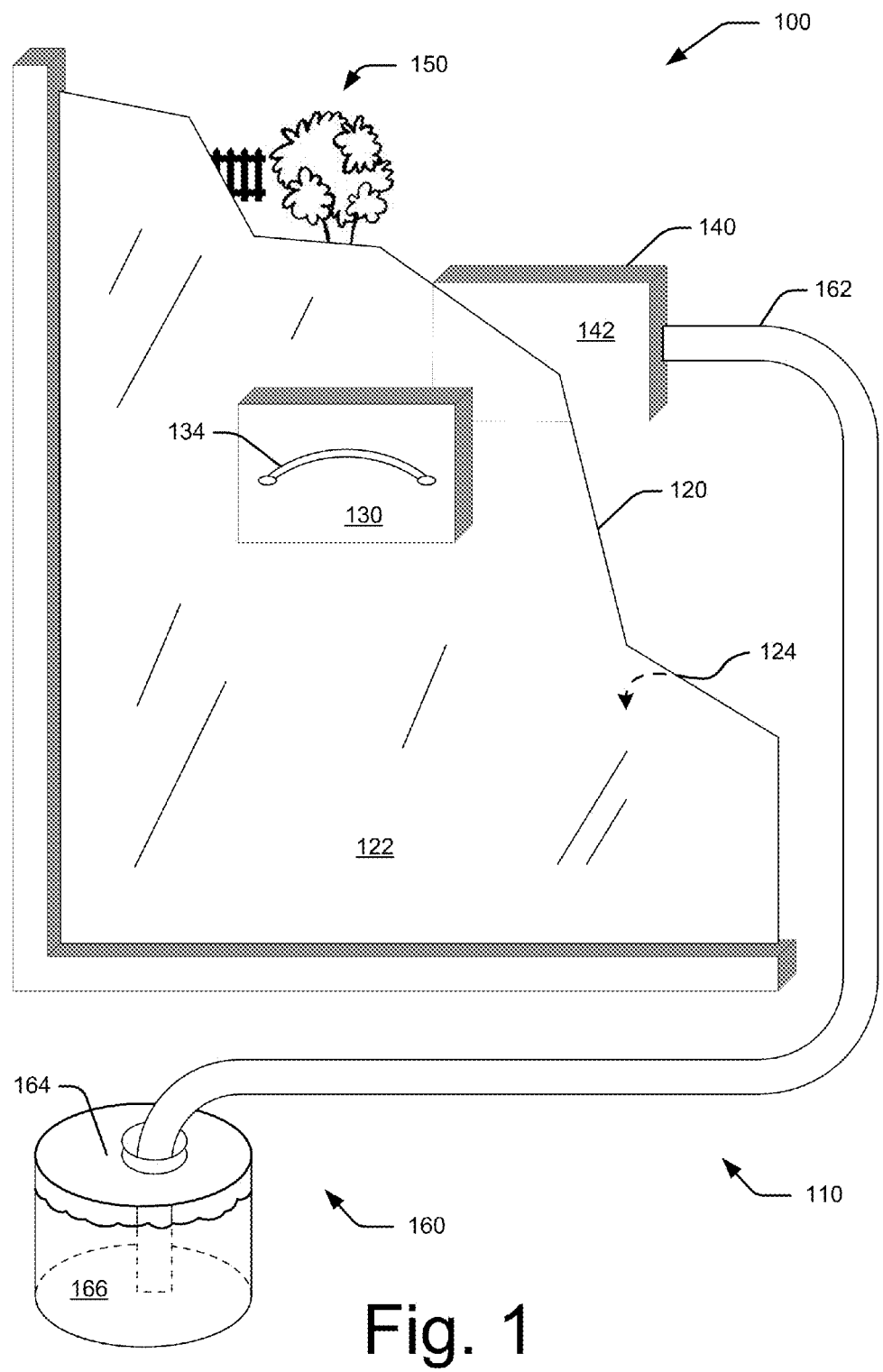
FIG. 1 illustrates an exemplary scenario in which an exemplary magnetic cleaning tool with fluid pump may be employed.

FIG. 1 depicts an exemplary "magnetic cleaning tool with fluid pump" 110 in an exemplary scenario 100 in which it might be used. The exemplary scenario 100 involves cleaning of the interior surface 122 and the exterior surface 124 of a window 120 with tool 110. The items depicted in FIG. 1 are not necessarily to scale. Rather, the items are depicted in a manner to aid in the explanation of the tool 110 and how it works.

The tool 110 includes an interior utensil 130 and an exterior utensil 140. In FIG. 1, the interior utensil 130 is shown on the inside of a house or building and facing the interior surface 122 of the window 120. Conversely, the exterior utensil 140 is shown on the outside of a house or building and facing the exterior surface 124 of the window 120. For context, things 150 which are typically outside are depicted on the same side of the glass as the exterior utensil 140. Alternatively, the interior utensil 130 may be called herein the first or leader utensil. Likewise, the exterior utensil 140 may be called herein the second or follower utensil.

The utensils (130 and 140) have magnetic properties configured in such a manner that the utensils magnetically couple to each other through the window 120. Each utensil has one or more permanent magnets incorporated therein with non-magnetic material (such as wood, plastic, metal, sponge, and the like) and arranged in a manner to attract the one or more permanent magnets of the other utensil through the window. In some implementations, the entire utensil may be composed of a permanent magnet. In other implementations, the interior utensil 130 may have an electromagnet configured to attract ferrous-based material in the exterior utensil 140.

Each utensil has a cleaning pad attached to the side of the utensil that faces the window. A pad 142 is shown attached to the exterior utensil 140. A pad 132 of the interior utensil 130 is shown in later drawings, but it is not shown in FIG. 1 because the pad 132 is facing away from the viewer in this figure. While called cleaning pads here, the pads may be used for other purposes such as polishing and buffing. The pads may be constructed from fabric, cloth, paper-based material, sponge, or other such material for cleaning, polishing, or buffing surfaces.

Figure 2:
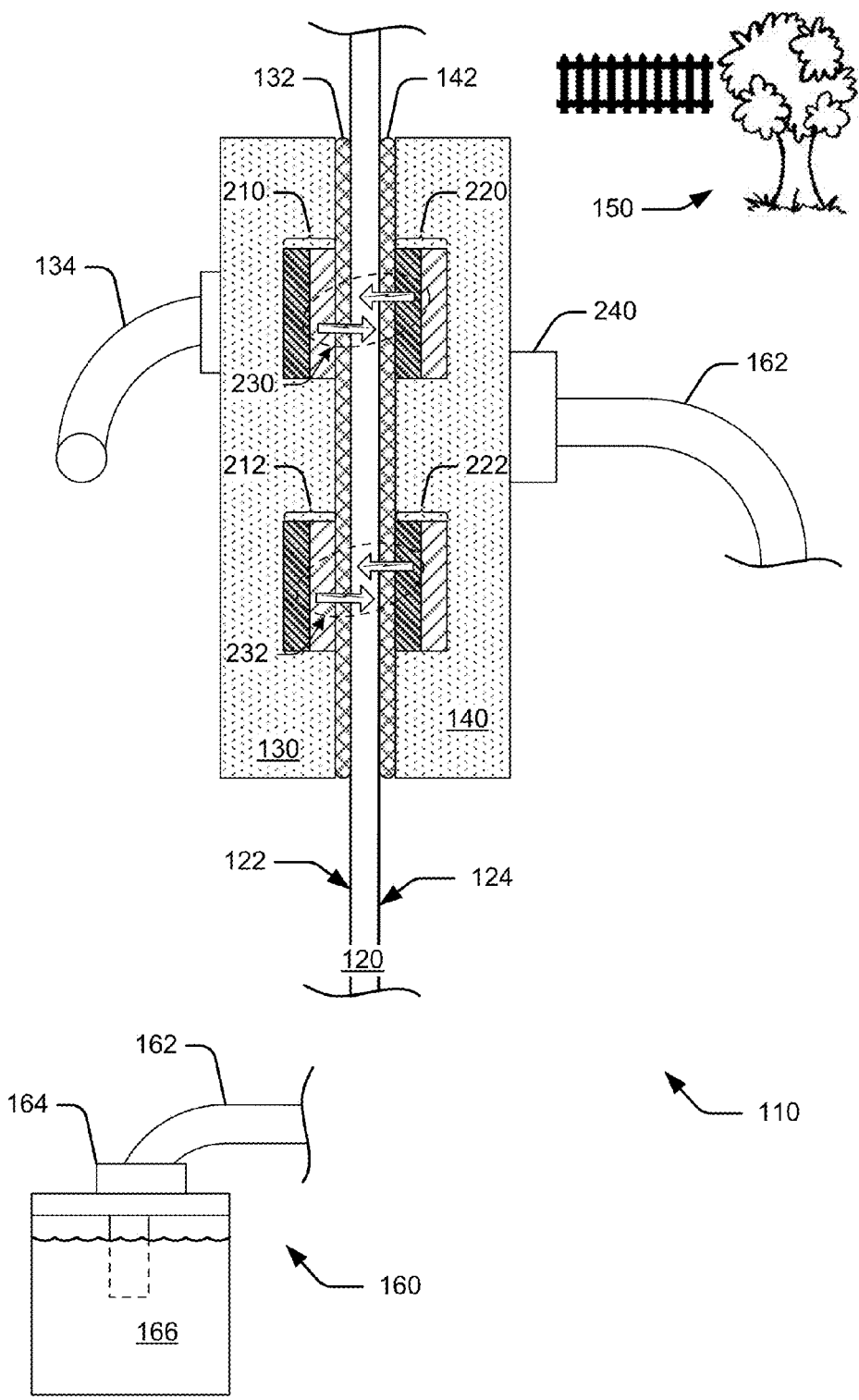
FIG. 2 illustrates a cross-sectional elevation view of the exemplary tool depicted in FIG. 1.

To aid in the replacement of and/or cleaning of the pads, the pads are configured to attach to their respective utensils via removal fastener, such as Velcro™ or adhesive. Of course, other suitable fasteners may be used to attach the pads. In alternative embodiments, covers may be used to perform the function of the cleaning pads described here. The covers would, of course, cover its respective utensil and be removable. Also, other alternative embodiments may not have a cover, pad, or the like. Instead, the utensils themselves may provide the cleaning surfaces. For example, the utensil may be constructed from a sponge-like material. In one or more embodiments, a magnetic coupling as illustrated in FIG. 2 is used, but the use of two pads which clip on through a hole in the center are implemented. One pad may be a sponge or similar material; the other may be a piece of foam covered by a removable buffing cloth that slides on and off enabling it to be washed when dirty, or otherwise replaced. The hole in the center of the pad is slightly smaller than the protrusion on the follower utensil and thus stays on.

The interior utensil 130 has a handle 134 for a user to hold or grip while sliding the utensil along the interior surface 122 of the window 120. Of course, any handle or gripping device may be used instead of the handle 134 shown in FIG. 1. Furthermore, the interior utensil 130 may be shaped and configured in a manner to aid gripping by a human hand. In that instance, no handle is needed.

A fluid-delivery system 160 is attached to the exterior utensil 140. The fluid-delivery system 160 includes a flexible fluid-conductive hose 162 (i.e., tube), a fluid pump 164, and a fluid reservoir 166. The exterior utensil 140 is attached to one end of the hose 162, and the fluid pump 164 and the reservoir 166 are attached to the other end.

Typically, the pump 164 and its reservoir 166 are located inside and the hose 162 is snaked out the window to the attached external utensil 140. While the tool 110 is in use, the pump 164 pumps some of the fluid in the reservoir 166 through the hose 162 and to the external utensil 140. The fluid may be cleaning fluid designed for the action of cleaning, buffing, and/or polishing windows (or another surfaces). The fluid may be, for example, a soap solution to clean or a water solution to rinse.

The hose 162 may be operatively connected to the external utensil 140 in such a manner to enable the fluid to reach the external surface 124 in an effective manner. The mechanism for doing that is called the fluid-delivery mechanism herein. For example, the fluid-delivery mechanism may be a spray nozzle attached to the external utensil 140 for spaying the fluid on the pad 142 and/or on the external surface 124 of the window 120. Another example of the fluid-delivery mechanism may be a nozzle dispenser incorporated into the external utensil 140 and designed to soak the pad 142 with the fluid pumped by the pump 164. The fluid-delivery mechanism may be considered to be part of the fluid-delivery system 160.

The hose or tube 162 serves a dual purpose: fluid transport and safety tether. The hose 162 facilitates in the transportation of fluid from the reservoir 166 inside to the exterior utensil 140 outside. The hose 162 acts as safety restraint should the utensils decouple and the external utensil 140 falls away. If this happens, the user may easily retrieve the escaped exterior utensil 140 via its tethering hose.

The pump 164 may be placed directly into a fluid (like the fluid in the reservoir 166) or placed next to a fluid with a second pump placed into the fluid. Regardless, the effective result is that the pump 164 pumps the fluid from the reservoir 166 up the hose 162 and dispenses (e.g., squirts) the fluid onto the exterior surface 124 and/or onto the exterior utensil 140.

Either automatically or manually, the fluid is dispensed on the exterior surface 124 of the window 120 and/or on the pad 142 while the exterior utensil 140 mirrors the movement of the interior utensil 130 that it is magnetically coupled thereto. In doing so, the entire expanse of the exterior surface 124 can be accessed and cleaned. Alternatively or in addition to, the interior utensil 130 may be cleaning and/or wiping the interior surface 122 of the window 120 while guiding the magnetically coupled exterior utensil 140. The user may trigger bursts of fluid delivery with a manually triggering of the pump 164. Alternatively, the fluid delivery system may provide a continuous stream of fluid to the exterior utensil 140.

FIG. 2 illustrates the tool 110 in at least a partial cross-sectional view while the pair of utensils are magnetically coupled though the window 120. The same components shown in FIG. 1 are shown again, but in a partial cross-sectional view.

The interior utensil 130 is shown pressed against the interior surface 122 of the window 120. Likewise, the exterior utensil 140 is shown pressed against the exterior surface 124 of the window 120. The interior utensil 130 includes two magnets (210 and 212). Likewise, the exterior utensil 140 includes two magnets (220 and 222). The polarity of each magnet (210, 212, 220, and 222) is depicted in FIG. 2 by different hatching.

A pair of attraction arrows (230 and 232) is shown with each magnetically coupled set of magnets (210 and 220; 212 and 222) between the pair of utensils. These pairs of arrows are intended to indicate a magnetic attraction between the polar opposite facing magnets of the facing utensils.

The cleaning pad 132 is shown between the interior utensil 130 and the interior surface 122 of the window 120. Similarly, the cleaning pad 142 is shown between the exterior utensil 140 and the exterior surface 124 of the window 120. The handle 134 is shown (in cross-section) attached to the interior utensil 130. The flexible, fluid-conductive hose 162 is shown attached to the exterior utensil 140 via hose coupling 240.

FIG. 2 also shows the fluid delivery system 160, which includes the hose 162, pump 164, and reservoir 166. The pump may be any suitable pump for transferring fluid from the reservoir 166 to the exterior utensil 140. Examples of such pumps include (but are not limited to) positive displacement pumps, rotary lobe pump, progressive cavity pump, peristaltic pump, plunger pump, rotary gear pump, piston pump, hydraulic pump, vane pump, regenerative (peripheral) pump, diaphragm pump, impulse pump, screw pump, gear pump, and the like. The pump may be electrically powered, manually powered, pneumatically powered, or the like.

The interior utensil 130 may be described as a guiding means for a human to hold and glide over one of two opposing surfaces of a plate. That is, the interior utensil 130 glides over the interior surface 122 of the window 120. The exterior utensil 140 may be described as a cleaning means for cleaning the surface opposite of the surface on which the guiding means glides over. That is, the exterior utensil 140 cleans the exterior surface 124 of the window 120. The exterior utensil 140 may also be described as a mirroring-movement means of mirroring a movement of the guiding means by the cleaning means over the surface opposite of the surface on which the guiding means glides over. That is, the exterior utensil 140 mirrors the movement of the interior utensil 130 because it is magnetically coupled through the window 120 to the interior utensil. The fluid-delivery system 160 may be described as a fluid-delivery means for delivering fluid to the cleaning means (e.g., exterior utensil 140).

Another Exemplary Magnetic Cleaning Tool with Fluid Pump

Figure 3:
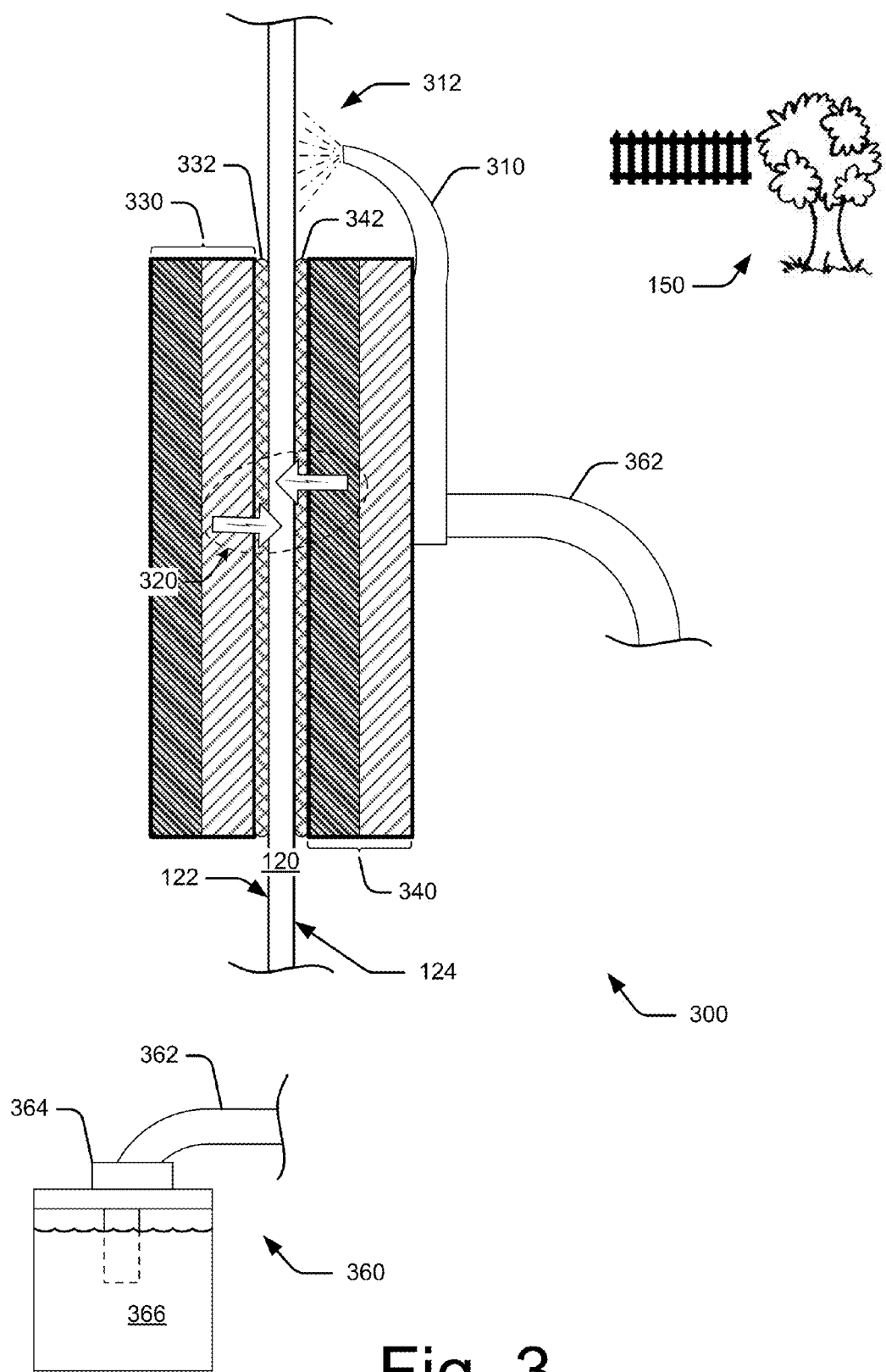
FIG. 3 illustrates a cross-sectional elevation view of another exemplary magnetic cleaning tool with fluid pump.

FIG. 3 shows another exemplary tool 300. This tool is much like tool 110 described herein. The tool 300 includes an interior utensil 330 and an exterior utensil 340. In FIG. 3, the interior utensil 330 is shown on the inside of a house or building and facing the interior surface 122 of the window 120. Conversely, the exterior utensil 340 is shown on the outside of a house or building and facing the exterior surface 124 of the window 120. For context, outside things 150 which are typically found outside are depicted on the same side of the window as the exterior utensil 340.

These utensils (330 and 340) of this tool 300 have magnetic properties like the utensils (130 and 140) of tool 110. However, unlike the previously depicted utensils, each of these utensils (330 and 340) is primarily a single contiguous permanent magnet. The polarity of each magnet (330 and 340) is depicted in FIG. 3 by different hatching. A pair of attraction arrows 320 is shown with the magnetically coupled utensils 330 and 340. These pairs of arrows are intended to indicate a magnetic attraction between the polar opposite facing magnets of the facing utensils.

Each utensil has a cleaning pad attached to the side of the utensil that faces the window 120. A pad 342 is shown attached to the exterior utensil 340. A pad 332 is shown attached to the interior utensil 330.

Unlike the interior utensil 130 depicted earlier, the interior utensil 330 has no handle. Instead, the interior utensil 330 is shaped and configured in a manner to be gripped by a human hand.

A fluid-delivery system 360 is attached to the exterior utensil 340. The fluid-delivery system 360 includes a flexible fluid-conductive hose 362 (i.e., tube or tubing), a fluid pump 364, and a fluid reservoir 366. The exterior utensil 340 is attached to one end of the hose 362 and the fluid pump 364 and the reservoir 366 are attached to the other end.

The hose 362 may be operatively connected to a fluid-delivery mechanism of the external utensil 340 in such a manner to enable the fluid to reach the external surface 124 in an effective manner. As shown, the fluid-delivery mechanism has a spray nozzle 310 for spraying the fluid on the pad 342 and/or on the external surface 124 of the window 120. In FIG. 2, the fluid is shown in a spray 312 squirting the exterior surface 124 of the window 120. The fluid-delivery mechanism may be considered to be part of the fluid-delivery system 360.

The interior utensil 330 may be described as a guiding means for a human to hold and glide over one of two opposing surfaces of a plate. That is, the interior utensil 330 glides over the interior surface 122 of the window 120. The exterior utensil 340 may be described as a cleaning means for cleaning the surface opposite of the surface on which the guiding means glides over. That is, the exterior utensil 340 cleans the exterior surface 124 of the window 120. The exterior utensil 340 may also be described as a mirroring-movement means of mirroring a movement of the guiding means by the cleaning means over the surface opposite of the surface on which the guiding means glides over. That is, the exterior utensil 340 mirrors the movement of the interior utensil 330 because it is magnetically coupled through the window 120 to the interior utensil. The fluid-delivery system 360 may be described as a fluid-delivery means for delivering fluid to the cleaning means (e.g., exterior utensil 340).

Additional and Alternative Implementation Notes

The primary purpose of one or more implementations of the exemplary magnetic cleaning tool described herein is to clean surfaces which, primarily due to their location, are hard to reach. While windows are the most notable example of this surface, the tool may be used for any surface for which the magnetic force would be strong enough for the "interior" magnet to move the "exterior" magnet. In an alternative implementation, a Squeegee may be used on the follower utensil for cleaning the window and which would likely be removable. In another implementation, a screw system associated with the magnets may be used to enable, by way of twisting of the screw system or the like, increasing/decreasing the distance of the magnets from the window and thus change the magnetic force depending on need, surface and thickness of glass (single/double paned)

Cleaning windows is one application of one or more implementations of the exemplary magnetic cleaning tool. In that instance, the surface being cleaned is glass. However, other applications for one or more implementations is for other material that is both thin enough and be non-magnetic enough to not interfere with the magnetic coupling of the utensil therethrough. Examples of such magnetically permeable material may include (by way of illustration and not limitation) glass, plastic, Bakelite, polyethylene terephthalate, polyethylene, polyvinyl chloride, polyvinyl chloride, polyvinylidene chloride, polypropylene, polystyrene, polyamides, acrylonitrile butadiene styrene, polycarbonate, polycarbonate/acrylonitrile butadiene styrene, polyurethanes, acrylic, ceramic, crystal, stone, laminates, wood, plant-base material, non-ferrous metals and alloys, porcelain, and aluminum oxynitride. Also, examples of surfaces (other than a glass window's surface) may include (by way of example and not limitation) plastic windows, aluminum siding, walkways or foot bridges, holding vats, glass safety guard railings, car windows, car windshields, aquariums, flower vases, large tubes, etc.

The magnets used herein may be constructed from one or more of the following materials (by way of example and not limitation): ferromagnetic materials, paramagnetic materials, composites (such as ceramic, ferrite, and alnico), rare-earth magnets (such as samarium-cobalt and neodymium-iron-boron).

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

For the purposes of this disclosure and the claims that follow, the terms "coupled" and "connected" may have been used to describe how various elements interface. Such described interfacing of various elements may be either direct or indirect.

What is claimed is:

1. A window-cleaning tool for facilitating cleaning of windows, the window-cleaning tool comprising:
   an interior window-cleaning utensil configured to be held by a human hand while gliding the utensil across an interior surface of a window;
   an exterior window-cleaning utensil configured to magnetically couple with the interior utensil through the window while in contact with the exterior surface of the window, the exterior utensil being further configured to move along the exterior surface of the window in a manner that mirrors the movements of the interior utensil as it moves across the interior surface of the window; and
   a fluid-delivery system including a fluid pump, a fluid-conductive tube, and a fluid-delivery mechanism,
      the fluid-conductive tube being operatively connected to the exterior utensil, the tube being configured to tether the exterior utensil to keep the exterior utensil in reach in case the utensils decouple;
      the fluid pump being operatively connected to the exterior utensil via the tube, the fluid pump being configured to pump fluid through the tube to the exterior utensil; and
      the fluid-delivery mechanism being operatively connected to the exterior utensil and to the tube, the fluid-delivery mechanism being configured to deliver fluid pumped through the tube to the exterior surface of the window.

2. A window-cleaning tool as recited in claim 1, wherein the exterior utensil is configured for attachment of a cleaning pad or squeegee thereto, wherein the cleaning pad or squeegee is configured to facilitate cleaning, polishing, and/or buffing of the window.

3. A window-cleaning tool as recited in claim 1, wherein the exterior utensil is configured for attachment of a cleaning cover thereto, wherein the cleaning cover is configured to facilitate cleaning, polishing, and/or buffing of the window.

4. A window-cleaning tool as recited in claim 1, wherein the fluid-delivery mechanism includes a fluid-spraying nozzle configured to spray fluid conducted through the tube onto the exterior surface of the window and/or onto the exterior utensil.

5. A window-cleaning tool as recited in claim 1, wherein the fluid-delivery mechanism includes a fluid-dispensing nozzle configured to soak a cleaning pad and/or cleaning cover attached to the exterior utensil.

6. A window-cleaning tool as recited in claim 1, wherein the exterior and/or the interior utensil include one or more permanent magnets.

7. A window-cleaning tool as recited in claim 1, wherein the exterior or the interior utensil include one or more permanent magnets while the other utensil includes ferrous-based material configured to be magnetically attracted to the one or more permanent magnets of the other utensil.

8. A window-cleaning tool as recited in claim 1, wherein the exterior or the interior utensil includes one or more electromagnets while the other utensil includes ferrous-based material configured to be magnetically attracted to the one or more electromagnets of the other utensil.

9. A window-cleaning tool as recited in claim 1, wherein the window is composed of magnetically permeable material selected from a group consisting of glass, plastic, Bakelite, polyethylene terephthalate, polyethylene, polyvinyl chloride, polyvinyl chloride, polyvinylidene chloride, polypropylene, polystyrene, polyamides, acrylonitrile butadiene styrene, polycarbonate, polycarbonate/acrylonitrile butadiene styrene, polyurethanes, acrylic, ceramic, crystal, stone, laminates, wood, plant-base material, non-ferrous metals and alloys, porcelain, and aluminum oxynitride.

10. An apparatus comprising:
   a first utensil configured to be held by a human hand while gliding the utensil across a first surface of a magnetically permeable material;
   a second utensil configured to magnetically couple with the first utensil through the magnetically permeable material which is in contact with a second surface of the magnetically permeable material, which is opposite of the first surface, the second utensil being further configured to move along the second surface of the magnetically permeable material in a manner that mirrors the movements of the first utensil as it moves across the first surface of the magnetically permeable material; and a fluid-delivery system including a fluid pump and a fluid-conductive tube, the fluid-conductive tube being operatively connected to the second utensil, the tube being configured to tether the second utensil to keep the second utensil in reach in case the utensils decouple; and the fluid pump being operatively connected to the second utensil via the tube, the fluid pump being configured to pump fluid through the tube to the second utensil.

11. An apparatus as recited in claim 10, wherein the second utensil is configured for attachment of a cleaning pad and/or cover thereto, wherein the cleaning pad and/or cover is configured to facilitate cleaning, polishing, and/or buffing of the magnetically permeable material.

12. An apparatus as recited in claim 10, wherein the fluid-delivery system further includes a fluid-delivery mechanism being operatively connected to the second utensil and to the tube, the fluid-delivery mechanism being configured to deliver fluid pumped through the tube to the second surface of the magnetically permeable material.

13. An apparatus as recited in claim 12, wherein the fluid-delivery mechanism includes a fluid-spraying nozzle configured to spray fluid conducted through the tube onto the second surface of the magnetically permeable material and/or onto the second utensil.

14. An apparatus as recited in claim 12, wherein the fluid-delivery mechanism includes a fluid-dispensing nozzle configured to soak a cleaning pad and/or cleaning cover attached to the second utensil.

15. An apparatus as recited in claim 10, wherein the second and/or the first utensil include one or more permanent magnets.

16. An apparatus as recited in claim 10, wherein the second or the first utensil include one or more permanent magnets while the other utensil includes ferrous-based material configured to be magnetically attracted to the one or more permanent magnets of the other utensil.

17. An apparatus as recited in claim 10, wherein the second or the first utensil includes one or more electromagnets while the other utensil includes ferrous-based material configured to be magnetically attracted to the one or more electromagnets of the other utensil.

18. An apparatus as recited in claim 10, wherein the magnetically permeable material is configured as a window.

19. An apparatus as recited in claim 10, wherein the magnetically permeable material is composed of material selected from a group consisting of glass, plastic, Bakelite, polyethylene terephthalate, polyethylene, polyvinyl chloride, polyvinyl chloride, polyvinylidene chloride, polypropylene, polystyrene, polyamides, acrylonitrile butadiene styrene, polycarbonate, polycarbonate/acrylonitrile butadiene styrene, polyurethanes, acrylic, ceramic, crystal, stone, laminates, wood, plant-base material, non-ferrous metals and alloys, porcelain, and aluminum oxynitride.

* * * * *